(12) United States Patent
Chang

(10) Patent No.: US 6,650,086 B1
(45) Date of Patent: Nov. 18, 2003

(54) AUTOMATIC DETECTING AND SWITCHING VEHICLE CHARGER

(76) Inventor: I-Chang Chang, 235 P.O. Box 10-69, Chung-Ho (TW)

( * ) Notice: Subject to any disclaimer, the term of this patent is extended or adjusted under 35 U.S.C. 154(b) by 0 days.

(21) Appl. No.: 10/303,939

(22) Filed: Nov. 26, 2002

(51) Int. Cl.[7] ............................................. H01M 10/46
(52) U.S. Cl. ........................ 320/105; 320/134; 320/136
(58) Field of Search ................................ 320/104, 105, 320/107, 112, 113, 114, 115, 134, 136

(56) References Cited

U.S. PATENT DOCUMENTS 3,763,415 A * 10/1973 Ownby
5,635,817 A * 6/1997 Shiska

* cited by examiner

Primary Examiner—Edward H. Tso

(57) ABSTRACT

An automatic detecting and switching vehicle charger having a power control circuit is disclosed. A power supply control circuit is connected to a positive electrode clip and a negative electrode clip for supplying power to a battery of a car; a conductive end of the positive electrode clip being further connected to an input end of the power supply control circuit through a signal conductive wire. The power supply control circuit is formed by a power supply unit, a parallel connected relay unit, a serial connected relay unit, a fault detection unit, a low level positive voltage detection unit, a high level positive voltage detecting unit, a reference voltage unit, an alarm unit and a state display unit. In that, the power sources are switched automatically and thus the user is unnecessary to prepare a plurality of batteries as standby devices.

7 Claims, 5 Drawing Sheets

AUTOMATIC DETECTING AND SWITCHING VEHICLE CHARGER

FIELD OF THE INVENTION

The present invention relates to vehicle chargers, and particularly to an automatic detecting and switching vehicle charger.

BACKGROUND OF THE INVENTION

Referring to FIG. 1, a prior art emergency device 1 of a charger of a vehicle is illustrated. In this prior art, battery 11 is connected to a positive electrode clip A and a negative electrode clip B (referring to FIG. 1—1). The connecting ends A1 and B1 of the clips A and B, respectively, clamp the positive electrode C1 and negative electrode C2 of a car so that when the power of the vehicle is insufficient. The power can be conducted from the battery 11.

However, in general, when the emergency device 1 is actuated, since the two ends of the clips A and B are opened. If the two ends A1 and B1 are contacted to one another, a large short circuit will be induced so as to generate a spark. This will induce a great threat to the children. Moreover, it is possible that the two electrodes are connected reversely so as to destroy the devices in the vehicle, such as computers, audios, etc.

To improve this defect, in one design, a positive electrode voltage detecting circuit and a negative electrode voltage detecting circuit are used to detect the polarities of the charger C. Thereby, before conduction, the clips A and B are insulated, when the positive electrode voltage detecting circuit detects a positive voltage, the small power relay conducts, and meanwhile a large power relay will excite so as to form a loop.

However, above mentioned device has some defects. Firstly, when the clips A and B are connected with wrong polarities. Since the large power relay is conductive, the polarities cannot be determined correctly and thus short circuit cannot be effectively avoided. Moreover, since in general, the voltage of a vehicle charger is generally 12V or 24V, but it is often that the voltage of the charger is not clearly indicted, if the large power relay is connected. It is possibly that the battery will be destroyed. Thereby, the prior art charger protection device has still some defects.

SUMMARY OF THE INVENTION

Thereby, the object of the present invention is to provide an automatic detecting and switching vehicle charger; a power supply control circuit being connected to a positive electrode clip and a negative electrode clip for supplying power to a battery of a car; a conductive end of the positive electrode clip being further connected to an input end of the power supply control circuit through a signal conductive wire; the power supply control circuit comprising: a power supply unit including a first battery and a second battery, and a main switch for controlling the switching of power; a parallel connected relay unit including a small power parallel connected relay set which is formed by two parallel connected small power relays, and a large power parallel connected relay set which is formed by two parallel connected large power relays; a serial connected relay unit being formed by a small power serial connected relay set having a small power relay and a large power serial connected relay set having the large power relay; a low level positive voltage detection unit is a detection circuit which includes an operation integrated circuit, a resistor and a first transistor and an input point of the power supply control circuit being connected to a positive voltage through a diode in a positive direction for rising the voltage to a third pin of an integrated circuit; a high level positive voltage detecting unit including a comparator which is formed by an operation integrated circuit, a limiting resistor and a second integrated circuit; the high level positive voltage detecting unit being connected to the input end of the power supply control circuit through a diode along a positive direction; then input voltage being divided by the resistors and then the divided voltages are outputted to a fifth pin of the operation integrated circuit; a reference voltage unit being connected to input ends of the low level positive voltage detecting unit and the high level positive voltage detecting unit for providing reference voltage; a fault detection unit including an operation integrated circuit; an input end of the fault detection unit being connected to a lower level voltage of the reference voltage unit and an input end for detecting the fault of the input end; an alert unit being connected to an output end of the fault detection unit for alerting faults; a state display unit being formed by resistors and displays for displaying various conditions; the states are switched by a third transistor, a fourth transistor and diodes and resistor.

By above structure, when the main switch is actuated, if it is not conducted, the large power relays will not conduct so that the power supply unit and output end has no voltage; thereby, the object of short circuit proof is achieved; if the polarities of the power supply control circuit is connected, the input end will has a positive voltage; when the positive voltage is larger than the reference voltage of the reference voltage unit, the exciting coil of the small power relay will is excited and the exciting coil of the large power relay is induced so that a lower level loop is formed; if the positive voltage captured from the input end is divided and the divided voltage is larger than a reference voltage of the reference voltage unit, the third transistor will ground and conduct, then the small power relay will conduct so that the large power relay is excited; then, the two batteries are serially connected so as to form a high level conductive loop so as to trigger the fourth transistor to conduct so that the low level positive voltage detection unit is shorted to the negative electrode so as to cut off the circuit; if another clip is pulled out, if no voltage is derived from the input end, then the small power relay will stop exciting so that the power supply unit will turn off.

The various objects and advantages of the present invention will be more readily understood from the following detailed description when read in conjunction with the appended drawing.

BRIEF DESCRIPTION OF THE DRAWINGS

FIG. 1—1 shows that a prior art emergency charger is clamped to a charger of a car.

DETAILED DESCRIPTION OF THE PREFERRED EMBODIMENTS

The automatic detecting and switching vehicle charger of the present invention will be described herein after. In the present invention, a power supply control circuit 2 is connected to a positive electrode clip A and a negative electrode clip B (referring to FIG. 3) for supplying power to the battery C. A conductive end A1 of the positive electrode clip A is further connected to an input end I/P of the power supply control circuit 2 through a signal conductive wire D. The method and structure of the present invention will be described herein.

Figure 1:
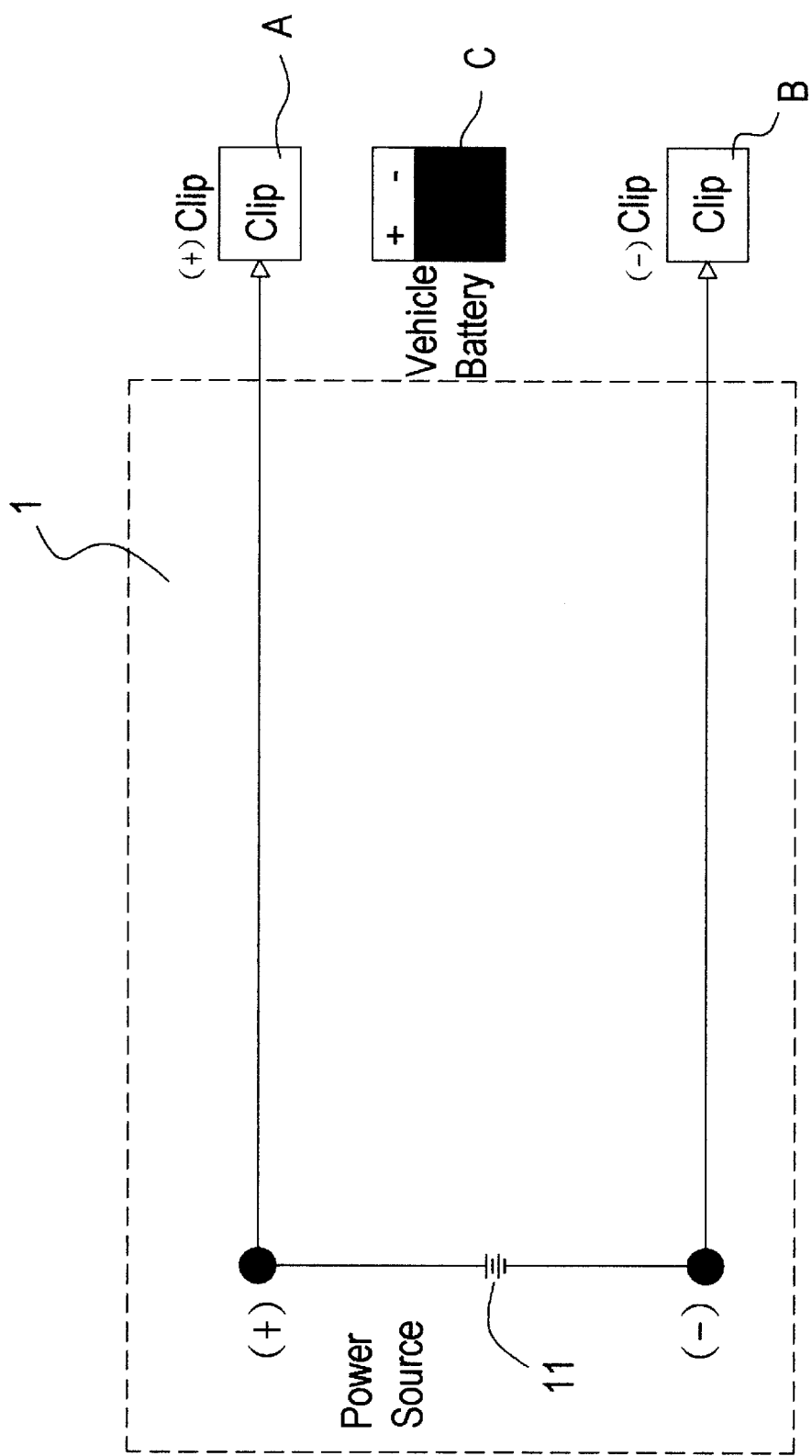
FIG. 1 is a schematic view of a prior art charger.
Figure 1:
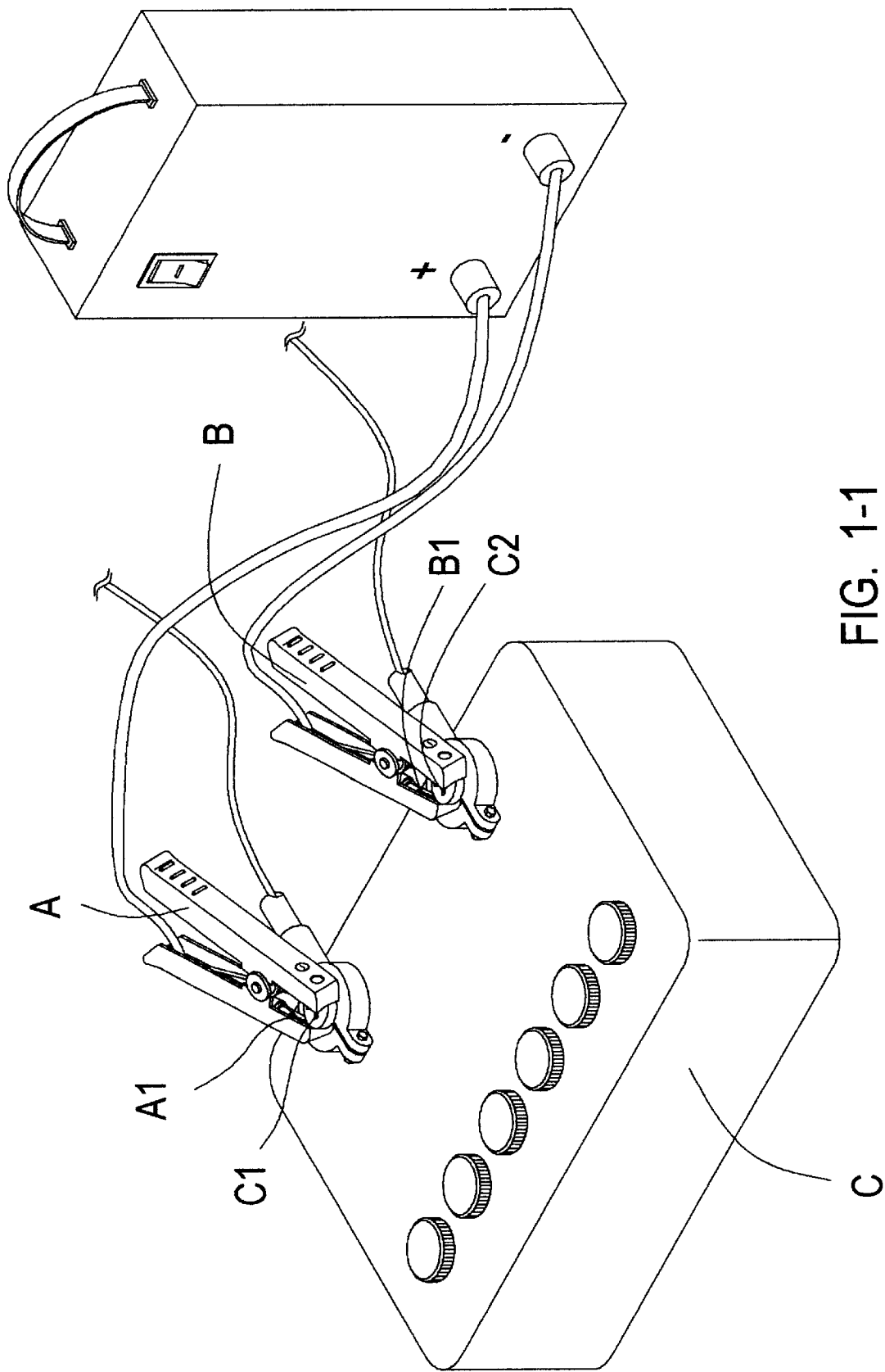
Figure 2:
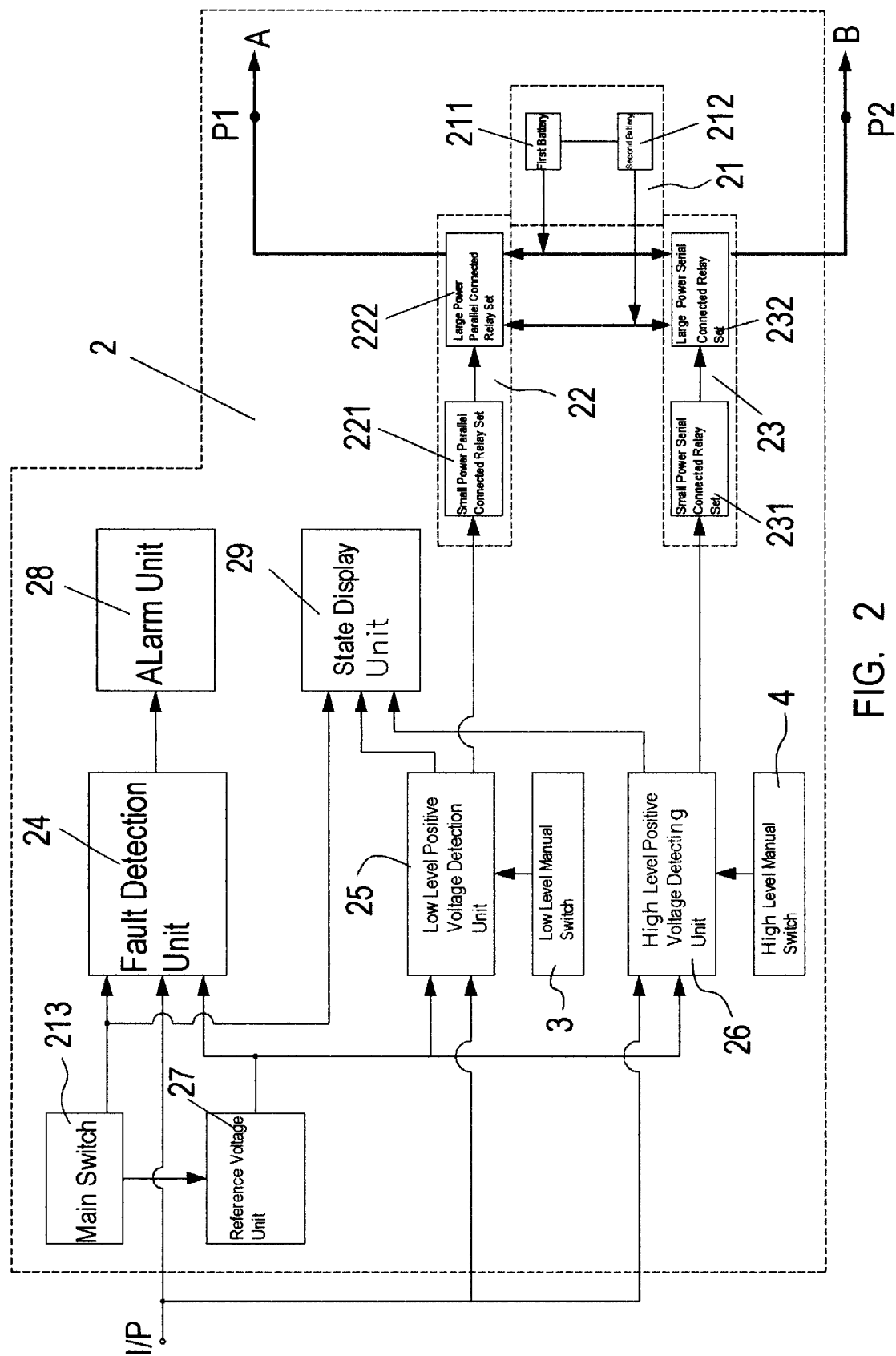
FIG. 2 is a structural block diagram of the present invention.
Figure 3:
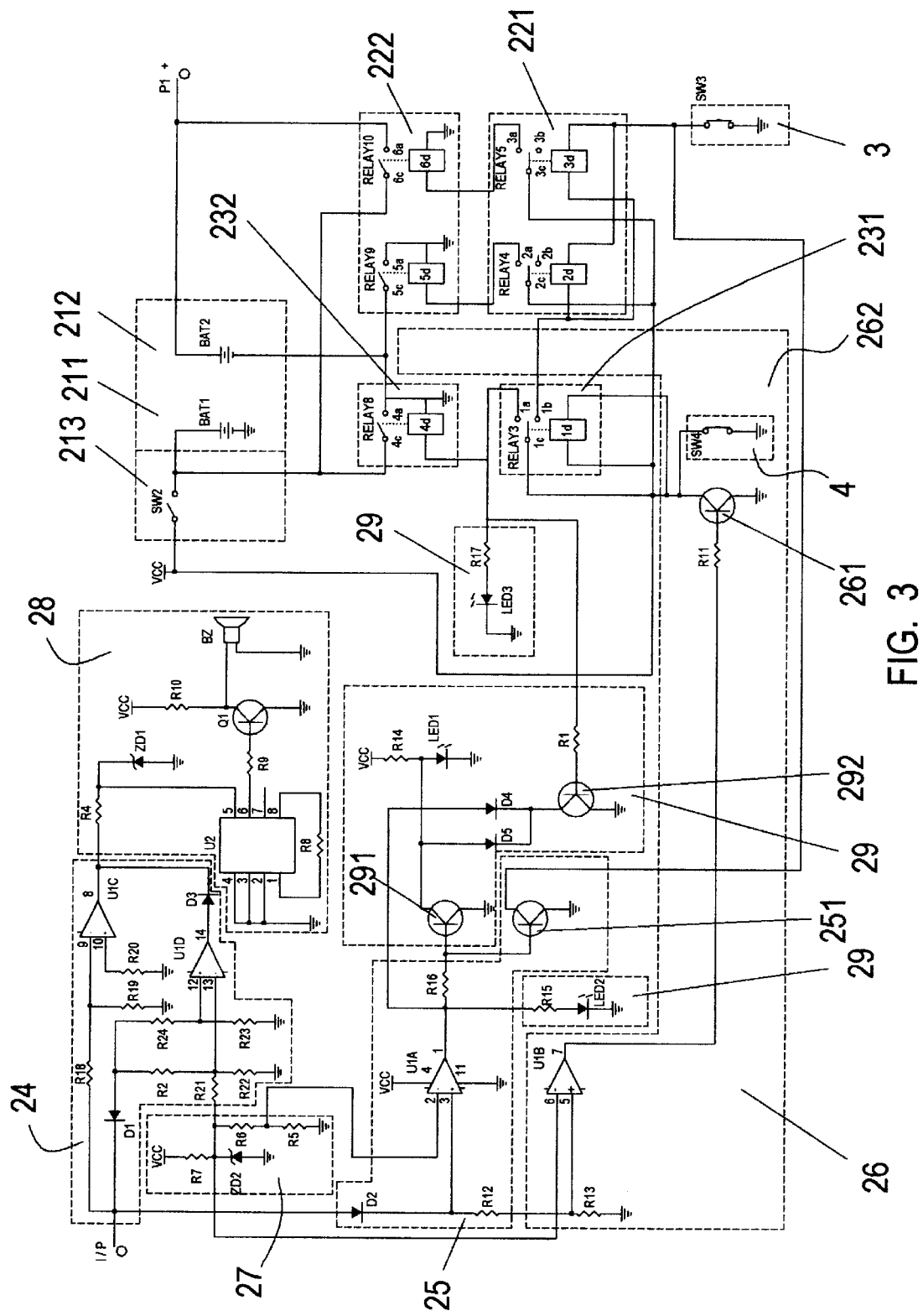
FIG. 3 is a circuit diagram of the present invention.
Figure 4:
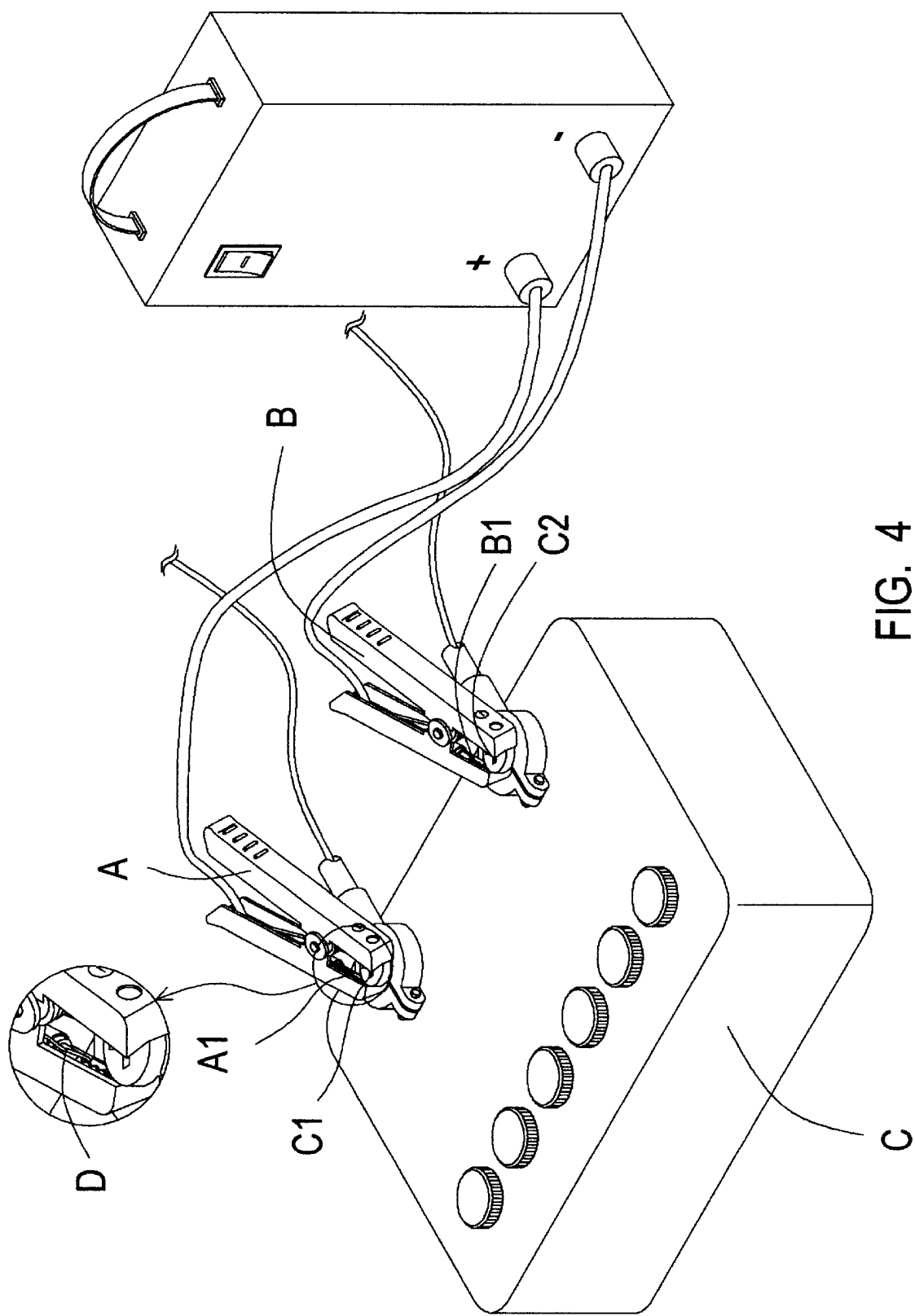
FIG. 4 shows that the present invention is clamped to a battery of a car.

The power supply control circuit 2 (referring to FIG. 2) is formed by a power supply unit 21, a parallel connected relay unit 22, a serial connected relay unit 23, a fault detection unit 24, a low level positive voltage detection unit 25, a high level positive voltage detecting unit 26, a reference voltage unit 27, an alarm unit 28 and a state display unit 29, as shown in the FIG. 3.

The power supply unit 21 includes a first battery 211 and a second battery 212, and a main switch 213 for controlling the switching of the power source Vcc.

The parallel connected relay unit 22 includes a small power parallel connected relay set 221 which is formed by two parallel connected small power relays RELAY2–RELAY3, and a large power parallel connected relay set 222 which is formed by two parallel connected large power relays RELAY5 and RELAY6. The normal-open joints of the small power relays RELAY2 and RELAY 3 are connected to the exciting coils 5d and 6d, respectively, of the large power relays, RELAY5 and RELAY6 and then further connected to the ground end. After the exciting coil 5d of the RELAY5 is serially connected to the second battery 212, the negative electrode is connected to the ground end. Thereby, in conduction, the first battery 211 and second battery 212 of the power supply unit 21 are connected together so as to generate a lower level power output.

The serial connected relay unit 23 is formed by a small power serial connected relay set 231 having the small power relay RELAY1 and a large power serial connected relay set 232 having the large power relay RELAY4. The normal opening joint 1a of the small power relay RELAY1 is connected to the exciting coil 4d of the large power relay RELAY4 and then is further grounded. Thereby, in conduction, the first battery 211 and second battery 212 of the power supply unit 21 are directly and serially connected to a high level power output end; and the exciting coil 1d of the small power relay RELAY1 is connected to common joints 2c and 3c of the small power relays RELAY2 and RELAY3, respectively, of the small power parallel connected relay set 221. The exciting coil 4d of the large power relay RELAY4 is serially connected to the normal opening joint 4a and then is connected to common joint 5c of the large power relay 5 of the large power parallel connected relay set 222 so that the serial connected relay unit 23 can be switched with the parallel connected relay unit 24.

The low level positive voltage detection unit 25 is a detection circuit which includes an operation integrated circuit U1A, a resistor 16 and a first transistor 252 and an input point I/P of the power supply control circuit 2 is connected to a positive voltage through a diode in a positive direction for rising the voltage to a third pin (+) of an integrated circuit U1A.

The high level positive voltage detecting unit 26 includes a comparator which is formed by an operation integrated circuit U1B, a limiting resistor R11 and a second integrated circuit 261. The high level positive voltage detecting unit 26 is connected to the input end I/P of the power supply control circuit 2 through a diode D2 along a positive direction. Then input voltage is divided by the resistors R12, R13 and then the divided voltages are outputted to a fifth pin (+) of the operation integrated circuit U1B.

The fault detection unit 24 includes a short signal comparator and a negative voltage signal comparator. The short signal comparator includes an operation integrated circuit UIC, and resistors R18, R19, and R20 and the negative voltage signal comparator includes an operation integrated circuit UID, and resistors R2, R21, R22, R23 and R24. When the input end I/P is shorted, the ninth pin (–) of the operation integrated circuit UIC will capture a short current. The current is compared with the ground of tenth pin (+) from the resistor R20. Then the grounded eighth pin (output) outputs a high voltage so that the integrated circuit UID will capture a negative voltage by the diode D1 reversely connected. Thereby, the fourteen pin (output) will output a high voltage.

The reference voltage unit 27 is formed by resistors R5, R6 and R7 and a Zener diode ZD2. The resistors R7 serves for limiting current. The Zener diode, a driving diode Q1, a buzzer BZ and resistors R4, R8, R9 and R10. The Zener diode serves for regulating voltages with a voltage of about 2.5 V. Then the voltage is divided by the resistors R5 and R6 and then the divided voltages are outputted to a reference voltage lower than one volt to the second pin (–) of the operation integrated circuit U1.

The alert unit 28 is formed by a music IC ICU2, a Zener diode ZD1, a driving transistor Q1, a buzzer BZ and a resistors R4, R8, R9 and R10. The Zener diode ZD1 serves for regulating voltage. The resistor,R4 serves to limiting current. By the resistor R4, the high voltages of the $8^{th}$ and $14^{th}$ pins of the operation integrated circuit UIC and operation integrated circuit UID in the fault detection unit 24 are received so that the music IC ICU2 will generate a push-pull current through the resistor 29 so that the buzzer BZ will actuate. Thus the object of alerting will be achieved.

A state display unit 29 is formed by resistors R14, R15, and R17 and displays LED1, LED2, and LED3 for displaying various conditions.

The states are switched by a third transistor 291, a fourth transistor 292 and diodes D4, D5 and resistor R1.

By above structure, when the main switch 213 is actuated, if it is not conducted, the large power relays will not conduct so that the power supply unit and output end has no voltage. Thereby, the object of short circuit proof is achieved. If the electrodes of the power supply control circuit are connected, the input end will has a positive voltage. When the positive voltage is larger than the reference voltage of the reference voltage unit 27, the exciting coil of the small power relay will is excited and the exciting coil of the large power relay is induced so that a lower level loop is formed. If the positive voltage captured from the input end is divided and the divided voltage is larger than a reference voltage of the reference voltage unit 27, the third transistor 291 will ground and conduct, then the small power relay will conduct so that the large power relay is excited. Then, the two batteries are serially connected so as to form a high level conductive loop to trigger the fourth transistor 292 to conduct so that the low level positive voltage detection unit is shorted to the negative electrode so as to cut off the circuit; if another clip is pulled out, and if no voltage is derived from the input end, then the small power relay will stop exciting so that the power supply unit will turn off.

Referring to FIGS. 2 and 3, in the present invention, exciting coils of the small power relays 221, 231 of the parallel connected relay unit 22 and the serial connected relay unit 23 are serially connected to the low level manual switch 3 and a high level manual switch 4. The low level manual switch 3 will enforce the parallel connected relay unit 22 to conduct when the voltage is lower than a set value of determining a low voltage. If the level voltage (for example, 24V) battery C is lower than a set value (for example, 14V) of determining a high voltage so that the system seems that it is a low voltage output, then a high level manual switch 4 can be actuated to enforce the serial connected relay unit 23 to conduct so as to have a high voltage output. Thereby, the system can be actuated.

The state display unit 29 and the alert unit 28 may be an image device selected from one of light emitting diodes, liquid crystal displays, and bulbs or a speech device. The controlling elements of the low level positive voltage detection unit 25 and high level positive voltage detection unit 26 may be one of diodes, transistors, rectifiers, comparators, and operational amplifiers, etc.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An automatic detecting and switching vehicle charger having a power control circuit; a power supply control circuit being connected to a positive electrode clip and a negative electrode clip for supplying power to a batteryof a car; a conductive end of the positive electrode clip being further connected to an input end of the power supply control circuit through a signal conductive wire; the power supply control circuit comprising:

a power supply unit including a first battery and a second battery, and a main switch for controlling the switching of power;

a parallel connected relay unit including a small power parallel connected relay set which is formed by two parallel connected small power relays, and a large power parallel connected relay set which is formed by two parallel connected large power relays; the normal-open joints of the small power relays being connected to exciting coils; respectively, of the large power relays and then further connected to the ground end; after the exciting coil of the large power relay being serially connected to the second battery and the negative electrode being connected to the ground end; thereby, in conduction, the first battery and second battery of the power supply unit being connected in parallel so as to have a lower level power output;

a serial connected relay unit being formed by a small power serial connected relay set having a small power relay and a large power serial connected relay set having the large power relay; the normal opening joint of the small power relay of a small power serial connected relay being connected to the exciting coil of the large power relay and then being further grounded; thereby, in conduction, the first battery and second battery of the power supply unit are directly and serially connected to a high level power output end; and the exciting coil of the small power relay is connected to common joints of the small power relays of the small power parallel connected relay set; the exciting coil of the large power relay being serially connected to the normal opening joint and then is connected to common joint of the large power relay of the large power parallel connected relay set so that the serial connected relay unit is switched with the parallel connected relay unit;

a low level positive voltage detection unit being a detection circuit which includes an operation integrated circuit, a resistor and a first transistor and an input point of the power supply control circuit being connected to a positive voltage through a diode in a positive direction for rising the voltage to a third pin of an integrated circuit;

a high level positive voltage detecting unit including a comparator which is formed by an operation integrated circuit, a limiting resistor and a second integrated circuit; the high level positive voltage detecting unit being connected to the input end of the power supply control circuit through a diode along a positive direction; then input voltage being divided by the resistors and then the divided voltages being outputted to a fifth pin of the operation integrated circuit;

a reference voltage unit being connected to input ends of the low level positive voltage detecting unit and the high level positive voltage detecting unit for providing reference voltage;

a fault detection unit including an operation integrated circuit; an input end of the fault detection unit being connected to a lower level voltage of the reference voltage unit and an input end for detecting the fault of the input end;

an alert unit being connected to an output end of the fault detection unit for alerting faults;

a state display unit being formed by resistors and displays for displaying various conditions; the states are switched by a third transistor, a fourth transistor and diodes and resistor;

whereby by above structure, when the main switch is actuated, if it is not conducted, the large power relays will not conduct so that the power supply unit and output end has no voltage; thereby, the object of short circuit proof is achieved; if the polarities of the power supply control circuit is connected, the input end will has a positive voltage; when the positive voltage is larger than the reference voltage of the reference voltage unit, the exciting coil of the small power relay will is excited and the exciting coil of the large power relay is induced so that a lower level loop is formed; if the positive voltage captured from the input end is divided and the divided voltage is larger than a reference voltage of the reference voltage unit, the third transistor will ground and conduct, then the small power relay will conduct so that the large power relay is excited; then, the two batteries are serially connected so as to form a high level conductive loop so as to trigger the fourth transistor to conduct so that the low level positive voltage detection unit is shorted to the negative electrode so as to cut off the circuit; if another clip is pulled out, if no voltage is derived from the input end, then the small power relay will stop exciting so that the power supply unit will turn off.

2. The automatic detecting and switching vehicle charger as claim in claim 1, wherein exciting coils of the small power relays of the parallel connected relay unit and the serial connected relay unit are serially connected to a low level manual switch; the low level manual switch will cause the parallel connected relay unit to conduct when the voltage is lower than a set value of determining a low voltage.

3. The automatic detecting and switching vehicle charger as claim in claim 1, wherein exciting coils of the small power relays of the parallel connected relay unit and the serial connected relay unit are serially connected to a high level manual switch; if the level voltage battery is lower than a set value of determining a high voltage, then a high level manual switch is actuated so as to enforce the serial connected relay unit to conduct so as to have a high voltage output.

4. The automatic detecting and switching vehicle charger as claim in claim 1, wherein the fault detection unit detects the condition of short circuit and reverse polarities in the connection of the batteries.

5. The automatic detecting and switching vehicle charger as claim in claim 1, wherein the state display unit and the alert unit are an image device selected from one of light emitting diodes, liquid crystal displays, and bulbs.

6. The automatic detecting and switching vehicle charger as claim in claim 1, wherein the state display unit and the alert unit are a speech device.

7. The automatic detecting and switching vehicle charger as claim in claim 1, wherein the controlling elements of the low level positive voltage detection unit and high level positive voltage detection unit are one of diodes, transistors, rectifiers, comparators, and operational amplifiers.

* * * * *